United States Patent
Brueck et al.

(10) Patent No.: US 9,393,521 B2
(45) Date of Patent: Jul. 19, 2016

(54) ELECTRICALLY HEATABLE HONEYCOMB BODY WITH MULTIPLE SHEET METAL LAYERS ELECTRICALLY CONNECTED WITH A CONNECTING PIN

(71) Applicant: EMITEC GESELLSCHAFT FUER EMISSIONSTECHNOLOGIE MBH, Lohmar (DE)

(72) Inventors: Rolf Brueck, Bergisch Gladbach (DE); Ferdi Kurth, Mechernich (DE); Peter Hirth, Roesrath (DE); Thomas Haerig, Neunkirchen-Seelscheid (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 180 days.

(21) Appl. No.: 14/330,135

(22) Filed: Jul. 14, 2014

(65) Prior Publication Data

US 2014/0322090 A1    Oct. 30, 2014

Related U.S. Application Data

(63) Continuation of application No. PCT/EP2013/050485, filed on Jan. 11, 2013.

(30) Foreign Application Priority Data

Jan. 13, 2012   (DE) .......................... 10 2012 000 496
Apr. 5, 2012    (DE) .......................... 10 2012 007 020

(51) Int. Cl.
   *B01D 39/14*   (2006.01)
   *B01D 39/06*   (2006.01)
   (Continued)

(52) U.S. Cl.
   CPC ............ *B01D 53/885* (2013.01); *F01N 3/2026* (2013.01); *F01N 3/281* (2013.01); *F01N2330/02* (2013.01); *F01N 2330/321* (2013.01); *F01N 2330/42* (2013.01); *F01N 2330/44* (2013.01); *Y02T 10/26* (2013.01)

(58) Field of Classification Search
   CPC ..... B01D 53/885; Y02T 10/26; F01N 3/2026; F01N 3/281; F01N 2330/02; F01N 2330/321; F01N 2330/42; F01N 2330/44
   See application file for complete search history.

(56) References Cited

U.S. PATENT DOCUMENTS

| 5,411,711 A | 5/1995 | Swars |
| 5,768,889 A | 6/1998 | Maus et al. |

(Continued)

FOREIGN PATENT DOCUMENTS

| DE | 102007001451 A1 | 7/2008 |
| DE | 102007010758 A1 | 9/2008 |

(Continued)

*Primary Examiner* — Amber R Orlando
(74) *Attorney, Agent, or Firm* — Laurence A. Greenberg; Werner H. Stemer; Ralph E. Locher (57) ABSTRACT

A honeycomb body includes sheet metal layers forming a central current path to a radial connecting pin. A metal casing has an inner periphery and a feedthrough guiding and insulating the pin. The layers are alternate coarsely structured and finely structured or smooth sheets forming a stack with uppermost and lowermost layers forming axial gas channels. The pin is metallically connected to two or all of the layers directly or through an intermediate piece by an electrically conductive or welded connection. The current path has an electrical resistance per unit length in the connection region being greater than an average electrical resistance per unit length in the stack. The uppermost layer runs approximately parallel to the casing over 35% or 40% of the inner periphery and is separated from the casing by an air gap. Simple manufacture of a highly uniform, reliably operating, electrically heatable honeycomb body is thus possible.

16 Claims, 6 Drawing Sheets

(51) Int. Cl.
*B01D 39/20* (2006.01)
*B01D 24/00* (2006.01)
*B01D 50/00* (2006.01)
*B01D 53/88* (2006.01)
*F01N 3/20* (2006.01)
*F01N 3/28* (2006.01)

(56) References Cited

U.S. PATENT DOCUMENTS

| | | |
|---|---|---|
| 5,865,864 A | 2/1999 | Bruck |
| 6,031,213 A | 2/2000 | Hashimoto et al. |
| 8,288,688 B2 | 10/2012 | Konieczny et al. |
| 8,761,586 B2 | 6/2014 | Brueck |
| 2008/0217315 A1* | 9/2008 | Bruck ............... B01J 35/0033 219/162 |

FOREIGN PATENT DOCUMENTS

| | | |
|---|---|---|
| DE | 102007025418 A1 | 12/2008 |
| EP | 0541585 B1 | 1/1994 |
| EP | 0716558 A2 | 6/1996 |
| EP | 1967712 B1 | 8/2011 |
| GB | 2313559 A | 12/1997 |
| WO | 9202714 A1 | 2/1992 |
| WO | 9417289 A1 | 8/1994 |
| WO | 9610127 A1 | 4/1996 |

* cited by examiner

ELECTRICALLY HEATABLE HONEYCOMB BODY WITH MULTIPLE SHEET METAL LAYERS ELECTRICALLY CONNECTED WITH A CONNECTING PIN

CROSS-REFERENCE TO RELATED APPLICATION

This is a continuation, under 35 U.S.C. §120, of copending International Application No. PCT/EP2013/050485, filed Jan. 11, 2013, which designated the United States; this application also claims the priority, under 35 U.S.C. §119, of German Patent Application DE 10 2012 000 496.6, filed Jan. 13, 2012 and German Patent Application DE 10 2012 007 020.9, filed Apr. 5, 2012; the prior applications are herewith incorporated by reference in their entirety.

BACKGROUND OF THE INVENTION

Field of the Invention

The present invention relates to the field of electrically heated honeycomb bodies, in particular for exhaust gas treatment systems of internal combustion engines, preferably in motor vehicles. Electrically heated honeycomb bodies are required, by way of example, for the purpose of heating components in an exhaust gas treatment system in order to achieve a defined minimum temperature for particular chemical reactions, in particular for catalytically activated reactions as well by way of this treatment. Such an exhaust gas treatment is used in the case of exhaust gas catalytic converters, particle filters or systems for reducing nitrogen oxide content.

A typical construction of such an electrically heated honeycomb body is described, for example, in International Publication No. WO 96/10127, corresponding to U.S. Pat. No. 5,768,889. European Patent EP 1 967 712 B1, corresponding to U.S. Patent Application Publication No. 2008/0217315 A1, also discloses the construction of an electrically heated honeycomb body. Those two documents describe the option of supporting such an electrically heated honeycomb body on an adjacent honeycomb body.

In order to be able to provide a high ohmic resistance that is sufficient for providing electrical heating, electrically heated honeycomb bodies typically include a stack of multiple sheet metal layers that together form at least one central electrically conductive current path and the multiple sheet metal layers are constructed in such a manner that they form channels through which a gas can flow in an axial direction. For that purpose, coarsely structured and finely structured or smooth metal sheets, by way of example a total of five to fifteen metal sheets, are layered alternately one on top of the other. The stack is formed by intertwining the stack in opposite directions in the shape of an S in such a manner that the stack fills a round or oval cross section, so that it is necessary to electrically insulate adjacent windings of the stack from one another. The insulation can be achieved by using insulating layers or by using electrically insulating air gaps. Air gaps that are used in the case of intense thermal expansions during operation can be stabilized by virtue of the fact that the windings of the stack are fastened to an adjacent honeycomb body by using supporting pins and as a consequence they are secured in their position. In this manner, it is also possible to stabilize relatively short electrically heated honeycomb bodies in the axial direction, for example disk-shaped honeycomb bodies that have an axial extension of only 1 to 5 cm.

It has been demonstrated that it is advantageous for the stability and the electrical properties of an electrically heated honeycomb body to construct the electrically heated honeycomb body from alternating coarsely structured and finely structured sheet metal layers, in particular from sheet metal layers that include a fine first corrugation, having a small first corrugation height and a small first corrugation length and from sheet metal layers having a second coarse structure, in particular having a second corrugation having a greater second corrugation height and a greater second corrugation length. It is preferred that the corrugated layers within a stack be brazed to one another at their contact points.

However, the electrical connection of the stack to an external energy source represents a problem. Since it is necessary to place the looped electrically conductive stack inside a metal casing tube, at least one supply line to the stack is required, with the supply line being electrically insulated from the casing tube. Typically the current strengths that are to be directed through the stack are of such a high magnitude that it is desirable to distribute the current in as uniform a manner as possible to the individual sheet metal layers of the stack even in the region where contact is made, or this uniform distribution may even be necessary in order to avoid damage.

Additionally, the electrical resistance per unit length in a connection region must not be too high with respect to the electrical resistance per unit length in the further progression of the stack, so that the connection region does not heat up too intensely as a result of the ohmic heat. That is important because on one hand an electrical connection outwards must not become too hot and on the other hand, particularly in a connection region, it is not possible to guarantee that the through-flowing gas has a cooling effect to the same extent as in the remaining progression of the stack.

In the case of embodiments known in the prior art, typically current distribution structures are therefore provided and the individual sheet metal layers of the stack terminate at the current distribution structures. The current distribution structure is in turn contacted by way of a connecting pin that is guided in an insulating manner through the metal casing of the honeycomb body. The current distribution structure that is typical in the case of the described construction is a type of half shell that extends parallel to the metal casing, terminates at the individual sheet metal layers and is metallically connected, in particular by using brazing material. The half shell must in turn be electrically insulated from the metal casing of the honeycomb body by using an insulating layer. The insulation can be achieved by using an air gap, however it is necessary for that purpose that the half shell be likewise stabilized in its position which is preferably achieved by using additional supporting pins. It is also always necessary in that case to consider the electrical insulation of the structures that are providing the support.

The problem of making contact occurs in the case of an electrically heated honeycomb body at least at one end of the stack, namely when the other end of the stack can be directly connected to the metal casing. In the event that the two ends of the stack are not to be connected to ground, it is necessary to make contact with the two ends of the stack accordingly.

SUMMARY OF THE INVENTION

It is accordingly an object of the invention to provide an electrically heatable honeycomb body with multiple sheet metal layers electrically connected with a connecting pin, which overcomes the hereinafore-mentioned disadvantages and at least partially solves the highlighted problems of the heretofore-known devices of this general type and, in particular, provides a honeycomb body having an electrical connection of multiple sheet metal layers at a connecting pin, in which the honeycomb body is to be simple and cost-effective to manufacture, avoids the use of a current distribution structure to a great extent and, in particular, renders possible a stable construction of an electrically heated honeycomb body without providing half shells between the metal casing and the stack of metal sheets.

With the foregoing and other objects in view there is provided, in accordance with the invention, a honeycomb body, comprising multiple sheet metal layers electrically connected to a connecting pin and together forming at least one electrically conductive central current path, and a metal casing having an inner circumference or periphery and a feedthrough guiding the connecting pin in an electrically insulating manner through the metal casing. The sheet metal layers are alternately disposed coarsely structured and finely structured or smooth metal sheets that together form a stack having an uppermost and a lowermost sheet metal layer, the stack encompassing channels between the sheet metal layers through which a gas can flow in an axial direction. The connecting pin extends in a radial direction through the metal casing and is metallically connected by an electrically conductive connection, in particular by using resistance welding, to at least two of the sheet metal layers, preferably at least half of the sheet metal layers, in particular all of the sheet metal layers directly or by way of at least one intermediate piece. The electrical resistance per unit length of the central current path in the connection region is at most 10% greater than a central electrical resistance per unit length of the central current path in the stack.

Although it appears difficult to connect a relatively thick connecting pin to multiple relatively thin (in comparison thereto) sheet metal layers that can in addition also still be structured, it has been established that not only is a direct connection possible to two or multiple sheet metal layers that lie one on top of the other or that are squashed together, but rather this configuration actually leads to the stack being held together in a very stable manner. This configuration in turn renders it possible to form an air gap in a stable manner between the stack and the metal casing without having to provide stabilizing structures such as half shells or current distribution structures. The two or multiple sheet metal layers that are connected to the connecting pin terminate practically at the identical site and are therefore not connected at a distance to one another to a current distribution structure. The central current path is shaped in the connection region in a possibly curved or irregular manner commencing from the connecting pin and prior to it extending in an approximately parallel manner with respect to the stack. This can also be regarded as a definition of the connection region so that the connection region is precisely the region in the proximity of the connecting pin in which the central current path does not yet extend in a substantially parallel manner with respect to the stack and/or includes a different electrical resistance per unit length than in the further progression of the stack. Reference is made to the fact that the current path must be constructed overall in such a manner that it does not include any partial regions in which the resistance in relation to the current that is flowing there during operation is of such a magnitude that there is a risk of the structure overheating or even melting. This is an important aspect when constructing the connection region. Although ohmic heat that is produced locally can be dissipated within specific limits to adjacent regions or to the surrounding gas, in particular when gas is flowing through the honeycomb body, it is however desirable to avoid particularly hot regions inter alia operating conditions precisely in the proximity of the connecting pin.

The connecting pin is preferably a type of (rigid) pin that is used, for example, for directing current from a connection cable to the sheet metal layers. Even if it is fundamentally possible in the case of the honeycomb body to provide multiple connecting pins, the structure having a single connecting pin (per electrical contact with a stack) is still preferred. It is preferred that this connecting pin extends on both sides of the metal casing and passes through a feedthrough that is provided in the metal casing. The feedthrough can be an opening in the metal casing and the opening can be modified to suit the cross section or rather the shape of the connecting pin. The feedthrough is particularly constructed so that gas cannot escape between the connecting pin and the metal casing and where necessary a sealing material is used. In addition, it is possible to provide for at least one retaining element or a movement compensating element to be provided in/on the feedthrough so that the connecting pin is also securely fixed by using auxiliary devices even in the case of a high thermal and/or dynamic loading.

Different basic shapes can be used when constructing the sheet metal layer. If structures are not embossed into the sheet metal layer, the layers are generally referred to as smooth layers, even if the layers are disposed in the metal casing in a curved/wound manner overall, for example, in an S-shape, helical-shape, U-shape, etc. If the sheet metal layers include embossed structures (corrugations, steps, knobs, etc.), the sheet metal layers are described as structured sheet metal layers. If the sheet metal layers are to be provided with different structures, the sheet metal layers that are provided with a greater structuring (with respect to the structure height/corrugation height in a transverse manner with respect to the sheet metal layer and/or with respect to the structure width/corrugation length) are described as "coarsely structured" and the sheet metal layers that are provided with a smaller (in comparison to the greater) structuring are described as "finely structured". It is possible for all of the sheet metal layers of the honeycomb body to form an (individual) or multiple stack, with the sheet metal layers then being disposed in such a manner that they are electrically insulated from one another.

It is possible by using the (structured) sheet metal layers to form channels so that the gas flow can penetrate the honeycomb body. Since this gas flow enters at a first end face and exits at a second end face, the gas can therefore flow through the honeycomb body in an "axial" direction. Even when it is preferred, where necessary for reasons of simplification of the manufacturing process and a lower flow resistance, that the channels themselves extend substantially in parallel to the axial direction, this is however not compulsory. It is also possible that at least one part (where necessary all parts) of the channels extend in an inclined manner with respect to the axial direction in a wave-shaped, helical-shaped manner, etc. (but have at least one connection to the two end faces).

The electrically conductive connection can be achieved by direct contact between the connecting pin and the sheet metal layer ("direct") and/or by using (at least) one intermediate piece, wherein the intermediate piece is positioned (in an electrically conductive manner) between the connecting pin and the sheet metal layer and, in particular, fastened to the two components (in a materially bonded manner). The intermediate piece can be embodied, for example, in a more (shape-)stable manner than the sheet metal layers, the intermediate piece can include a matching receiving device for one end of the connecting pin and/or achieve a current distribution function from a small cross section of the connecting pin to a (for example up to a maximum 300%) greater region of the at least one sheet metal layer. In particular, in the case of embodiments where the connecting pin has a considerably smaller diameter than the axial extension of the stack (thus the width of the sheet metal layers), it is useful to provide an intermediate piece in order to distribute a current uniformly in the connection region by way of the axial extension of the stack. The intermediate piece has in the peripheral direction of the metal casing only a very small extension of, for example, 2 to 10 mm. The intermediate piece can also be disposed inside the stack so that at least one part of the sheet metal layers is fastened outside on the intermediate piece.

The sheet metal layer does not include, in particular, an inner casing and/or an inner pipe that is positioned (in a concentric manner with respect to or rather) in the metal casing. The sheet metal layer extends commencing from an edge of the honeycomb body (in the proximity of the metal casing) up to a center region or rather the middle of the honeycomb body (and where necessary also returns at least once to the edge).

In accordance with another feature of the invention, the uppermost sheet metal layer in the stack extends over at least 35% of the inner periphery in an also parallel manner to the metal casing and the uppermost sheet metal layer is separated at this site from the metal casing by using an air gap. It is to be noted with respect to the air gap that the term "air gap" is understood to mean a space that is substantially free of built-in components or components but which does not exclude that electrically insulating built-in components are provided for the purpose of stabilizing the air gap or electrically insulating coatings are provided on the adjacent surfaces. As a consequence, the air gap extends, in particular, from the inner surface of the metal casing up to the surface of the opposite lying sheet metal layer. The air gap extends (contiguously) in the peripheral direction over at least 35% of the inner periphery of the metal casing. In order to ensure that the stack extends (almost) parallel to the metal casing, it is to be explained in other words that the width of the air gap (at least in wide regions) is (approximately) constant (if the structure of the uppermost/outermost sheet metal layer and/or the peripheral edge regions of the air gap are not taken into consideration, with the structure being provided where necessary). It is preferred that an air gap of this type be provided at least between the metal casing and the connecting pin and a bearing site (supporting pin) of the sheet metal layer, with the bearing site being adjacent in the peripheral direction. The air gap is also provided precisely in the (axial) region/cross section of the honeycomb body, in which the connecting pin is provided.

In accordance with a further preferred feature of the invention, the uppermost sheet metal layer in the stack even extends over at least 40% of the length of the inner periphery (approximately) parallel to the metal casing and is separated from the metal casing by an air gap. If the honeycomb body is viewed from its end face in the axial direction and divided in 360° angle region, then it is preferred that the uppermost sheet metal layer extends over an angle region of approximately less than 180° in parallel to the metal casing, at least however approximately 144°, depending upon the precise shape of the connection region and the progression of the stack inside the honeycomb body.

In accordance with an added preferred feature of the invention, the uppermost sheet metal layer, preferably also the lowermost sheet metal layer of the stack, is a finely structured or smooth sheet metal layer. This is particularly advantageous because it is preferred that the uppermost and/or the lowermost sheet metal layer of the stack can be metallically connected to the connecting pin, as a consequence of which the remaining sheet metal layers are almost encased and, even when the sheet metal layers cannot be connected to the connecting pin, the ends of the sheet metal layers do not have any freedom of movement and therefore cannot cause any electrical short circuits.

In accordance with an additional feature of the invention, the function of the uppermost and/or the lowermost sheet metal layer can be supported by virtue of the fact that one or both sheet metal layers have a greater thickness at least in partial regions and/or are thicker than the other sheet metal layers. In particular, the thicker partial regions can have a sheet metal thickness of 80 to 200 µm [micrometers], particularly preferably a thickness of 110 to 170 µm, whereas the other sheet metal layers typically have a thickness of 20 to 60 µm. A greater thickness can be achieved either by virtue of the fact that thicker metal sheets are used in the desired region and/or by virtue of the fact that the uppermost or rather the lowermost sheet metal layer include in the relevant region two or three structured sheet metal layers that lie one on top of another and where necessary together. In any case, it is preferred that this thicker sheet metal layer is also considerably thinner than the metal casing that has, for example, a thickness of more than 1 mm [millimeter].

In accordance with yet another preferred feature of the invention, the lowermost sheet metal layer has at least in one connection region and along one part of the stack a greater thickness and/or is thicker than the other sheet metal layers. By virtue of making the two outer sheet metal layers thicker, it is easier to make the metal connection to the connecting pin, in particular if the method of resistance welding is used.

In accordance with yet a further preferred feature of the invention, the uppermost sheet metal layer is embodied from a steel that contains nickel, chrome and iron and is also known under the name NiCroFer. The mechanical and electrical properties, in particular the good level of electrical conductivity and high temperature corrosion resistance of this material, render it particularly suitable to meet the requirements of the uppermost sheet metal layer.

In order to distribute the current uniformly in the stack, it is naturally preferred that all of the sheet metal layers be connected to the connecting pin. For this purpose, the sheet metal layers are either pressed together in order to smooth an existing structure, and/or the sheet metal layers are not structured at the ends.

In accordance with yet an added feature of the invention having a uniform tapering of a stack that includes coarsely structured and finely structured metal sheets prior to connecting to the connecting pin, it is advantageous for the coarsely structured metal sheets to be shorter than the smooth or finely structured metal sheets so that the coarsely structured metal sheets terminate before they arrive at the connecting pins and only the smooth or finely structured sheet metal layers in one connection region extend up to the connecting pin. Although there are fundamentally different options for squashing, crushing or squeezing together multiple structured sheet metal layers in one connection region or to allow the structuring to terminate, it is however simpler with regard to manufacturing technology to use different lengths of metal sheet in one stack than to provide a particular shape in the connection region. Even if the coarsely structured sheet metal layers each terminate at a different site, this is not particularly difficult with regard to the manufacturing technology, in particular if in the case of a symmetrical looped configuration of a honeycomb body with corresponding connections at both ends the length changes are compensated for by one another so that the corrugated sheet metal layers can be of an identical length despite different end points.

In accordance with yet an additional feature of the invention, in fact, tests have demonstrated that particularly stable constructions are produced if the coarsely structured metal sheets and finely structured metal sheets are in each case corrugated, wherein a second corrugation height of the coarsely structured metal sheets is greater than a first corrugation height of the finely structured metal sheets and in fact by a factor of 3 to 10, preferable 4 to 6. It has been demonstrated that taking into consideration different factors this type of structuring is advantageous. A particular amount of elasticity in all sheet metal layers facilitates the encapsulating of the supporting pins and, contrary to expectations, the electrically conductive connection to a connecting pin is hardly impeded.

In accordance with again another feature of the invention, when corrugated metal sheets are used for all of the sheet metal layers of the stack, it is also advantageous if the coarsely structured sheet metal layers have a second corrugation length that is greater than a first corrugation length of the finely structured sheet metal layers, and in fact at least by a factor of 1.5. It is also preferred that this factor does not exceed a value of 5, in particular does not exceed a value of 3. When selecting corrugation heights and corrugation lengths of the coarsely and finely structured sheet metal layers, it is important to observe technically sensible limits. In particular, the relationships and corrugation shapes are to be selected in such a way that as far as possible none of the channels have a very small cross section that could possibly be closed when providing a coating.

In accordance with again a further feature of the invention, when connecting the connecting pin to two or multiple sheet metal layers of the stack, this connection is preferably provided only to smooth or finely structured sheet metal layers and in fact, in particular, by using resistance welding.

In accordance with again an added feature of the invention, depending upon the prevailing spatial and technical conditions, it is possible in a further embodiment for the connecting pin to also be metallically connected to sheet metal layers of the stack by interpositioning an intermediate piece, wherein the intermediate piece includes multiple sheet metal layers of the stack in a connection region. It can be advantageous to use an intermediate piece if the thickness of the sheet metal layers in comparison to the cross section of the connecting pin is too small for a direct weld connection or sufficient press-down forces cannot be achieved during the welding process. Despite this, it is possible to connect the connecting pin, the intermediate piece and the sheet metal layers in some embodiments using a welding process.

It is possible by using the different described features to ensure that the connection region has an electrical resistance per unit length that is approximately constant (maximum 10% greater) or even preferably less than the stack in the further progression, in particular an electrical resistance per unit length that is at least 10% and particularly preferably a maximum of 20% less so that the connection region cannot warm up excessively because the small amount of ohmic heat that is produced there is dissipated sufficiently to the stack or the connecting pin. It is fundamentally desirable to keep the resistance in the connection region as low as possible since this region is cooled to a lesser extent and the connecting pin during operation is not to become too hot. However, this is not always achievable if current distribution structures, in particular half shell shaped current distribution structures, are not used. However, in accordance with the invention, the sheet metal layers are to be connected to the connecting pin or an intermediate piece in such a manner that the resistance per unit length in the connection region is not more than 10% above the average resistance per unit length of the stack. It is preferred that the resistance per unit length in the connection region is to deviate even less from the resistance per unit length of the stack or it is even to be less than the resistance per unit length of the stack.

In accordance with again an additional preferred feature of the invention, the connecting pin is metallically connected on a surface area of at least 10 mm$^2$ [square millimeters] to two (2) to five (5) sheet metal layers of the stack, wherein the connecting end of the connecting pin is at a distance of 3 to 8 mm [millimeters], preferably 4 to 6 mm, from the inner periphery of the metal casing. In this manner, the electrical connection can introduce the required electrical currents into the stack and at the same time stabilize the stack with sufficient distance from the metal casing that an electrical insulation is ensured between the stack and the metal casing by using an air gap.

In accordance with still another preferred feature of the invention, the preferred embodiment is an S-shaped configuration with intertwining of the stack in opposite directions, wherein the windings of the stack are electrically insulated from one another by air gaps. This embodiment is known per se, however, due to the mechanical movements of the sheet metal layers that occur during intense temperature changes, the embodiment could not be constructed without current distribution structures or half shells, which is now rendered possible by using the present invention so that it is also possible to achieve an electrical insulation of the stack with respect to the metal casing by using an air gap.

In accordance with still a further feature of the invention, at least the thicker uppermost sheet metal layer of the stack or its region of greater thickness extends only over one part of the length of the stack, preferably up to one inner end approximately in the central region of the honeycomb body.

According to the invention, precisely the uppermost sheet metal layer of the stack has special functions. In the case of an S-shaped construction, this uppermost sheet metal layer forms over almost half of the inner periphery the boundary between the insulating air gap and the metal casing, the uppermost sheet metal layer is used to provide the electrical connection to the connecting pin and delimits the inner sheet metal layers that are not connected to the connecting pin. If the uppermost sheet metal layer has a greater thickness or rather is thicker than the other sheet metal layers, then it has been demonstrated to be advantageous if this greater thickness is only over one part of the length of the stack, preferably up to approximately the central region of the honeycomb body. It has been established that in this partial region of the stack the uppermost sheet metal layer can be used simultaneously to distribute the electrical current in the stack. The current always tries to find the shortest path or rather the path with the lowest electrical resistance and for this reason the current tends to flow towards the inner region of the stack which is compensated for by using a thicker uppermost sheet metal layer. However, in the central region of the honeycomb body, the uppermost sheet metal layer becomes the lowermost sheet metal layer by using the configuration of the stack which is intertwined in opposite directions, for which reason it is advantageous to allow the sheet metal layers to terminate at the latest at this site or rather from that point onwards to continue with a thinner layer. This can be achieved by way of example at one of the points at which the looped-configuration also changes its direction.

In the case of a stack that is connected at both ends in accordance with the invention, the above considerations apply in each case for both ends, wherein inside the honeycomb body the uppermost sheet metal layer and the lowermost sheet metal layer of the stack interchange their position and function.

In accordance with a concomitant feature of the invention, in order to stabilize the connection region, it is particularly preferred that the shape of the stack be stabilized by using a multiplicity of supporting pins, wherein at least one supporting pin is disposed at a distance of less than 10 cm, preferably less than 5 cm, particularly preferably less than 2 cm, as measured along the progression of the stack, from the connecting pin. This configuration is used, in particular, to stabilize the air gap with respect to the metal casing.

Other features which are considered as characteristic for the invention are set forth in the appended claims, noting that the dependent claims can be combined with one another in a technically expedient manner.

Although the invention is illustrated and described herein as embodied in an electrically heatable honeycomb body with multiple sheet metal layers electrically connected with a connecting pin, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 3, 4, 5 and 7 are fragmentary, cross-sectional views

DETAILED DESCRIPTION OF THE INVENTION

Figure 1:
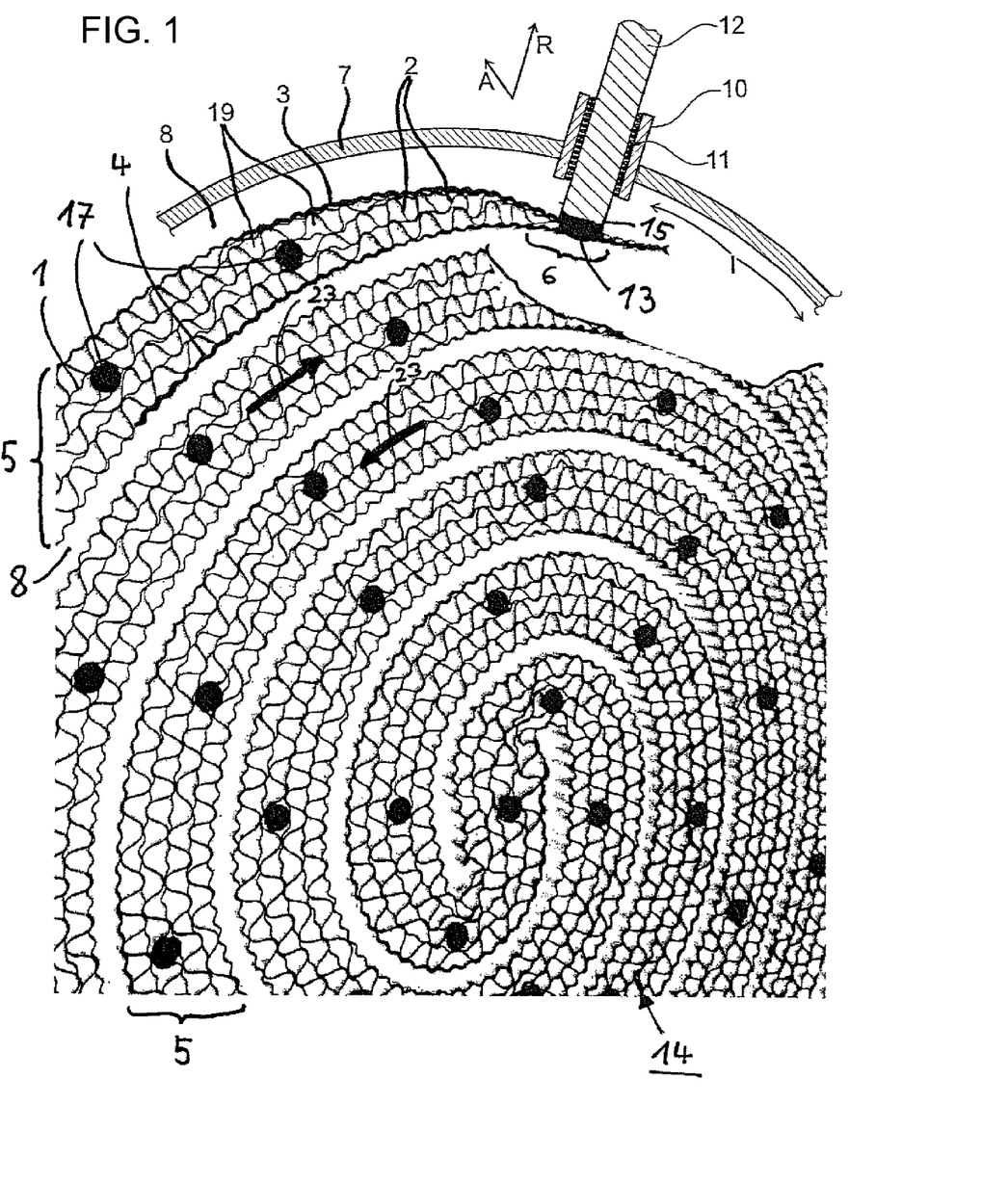
FIG. 1 is a fragmentary, diagrammatic, cross-sectional view of a region of an electrical connection of an electrically heated honeycomb body.

Referring now in detail to the figures of the drawings, which show further details and exemplary embodiments to which the invention is not limited, and first, particularly, to FIG. 1 thereof, there is seen a diagrammatic view of a partial region of an electrically heated honeycomb body 14 that is disposed in a metal casing 7. The honeycomb body 14 includes a stack 5 of smooth or finely structured sheet metal layers 1 that are disposed in an alternating manner with corrugated or coarsely structured sheet metal layers 2. The stack 5 includes an uppermost sheet metal layer 3 and a lowermost sheet metal layer 4 that are both finely structured in the present exemplary embodiment. The coarsely structured sheet metal layers 2 terminate one after the other within the stack 5, whereas the finely structured sheet metal layers 1 are provided further into a connection region 6 where they are connected, preferably welded, in particular by using resistance welding, to a connecting end 15 of a connecting pin 12. The connecting pin 12 is guided through a feedthrough 10 through the metal casing 7 and is insulated from the metal casing by an electrically insulating layer 11. The connecting pin 12 extends in a radial direction R as indicated by an arrow. The coarsely structured sheet metal layers 1 and the finely structured sheet metal layers 2 form channels 19 that extend in an axial direction A that is likewise indicated by an arrow. The metal casing 7 has an inner periphery I that is likewise indicated by arrows. At least the uppermost sheet metal layers 3 and the lowermost sheet metal layer 4 and preferably also other finely structured sheet metal layers 1 are connected in an electrically conductive connection 13 to the supporting pin 12. The stack 5 is stabilized by using supporting pins 17 that are supported on a further honeycomb body which is adjacent hereto and not illustrated in this figure. The sheet metal layers 1, 2, 3, 4 in the stack 5 together form a central (theoretical) current path 23, as indicated by arrows, and the current path has an average electrical resistance per unit length, in other words a typically average resistance along the progression of the stack 5.

Figure 2:
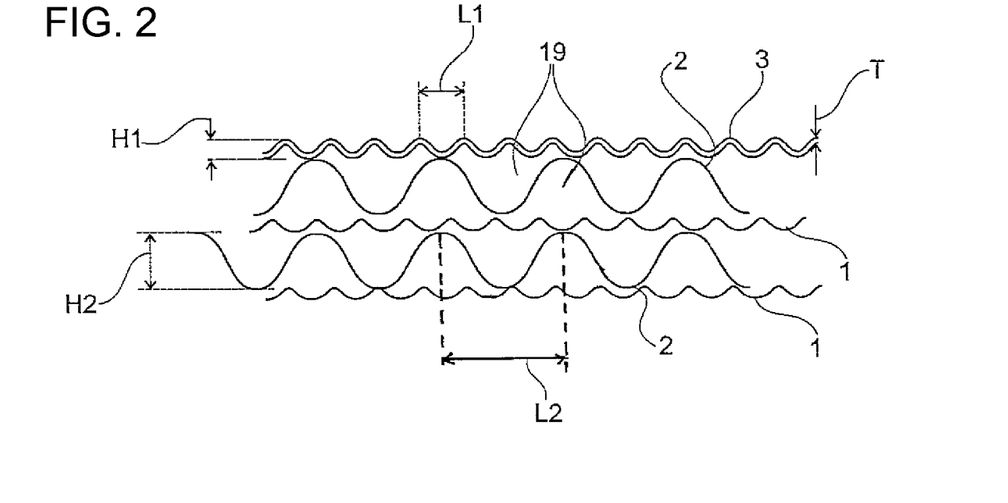
FIG. 2 is an enlarged, fragmentary, side-elevational view illustrating structures of sheet metal layers used in the honeycomb body according to the invention.

FIG. 2 illustrates the size relationships of the structures and the corrugations of the sheet metal layers 1, 2, 3, 4. The finely structured sheet metal layers 1 in the stack have a first corrugation with a first corrugation height H1 and a first corrugation length L1 that are both smaller than a second corrugation height H2 and a second corrugation length L2 of a second corrugation of the coarsely structured sheet metal layer 2. Furthermore, the uppermost sheet metal layer 3 can have a greater thickness T than the other sheet metal layers 1, 2 of the stack.

Figure 3:
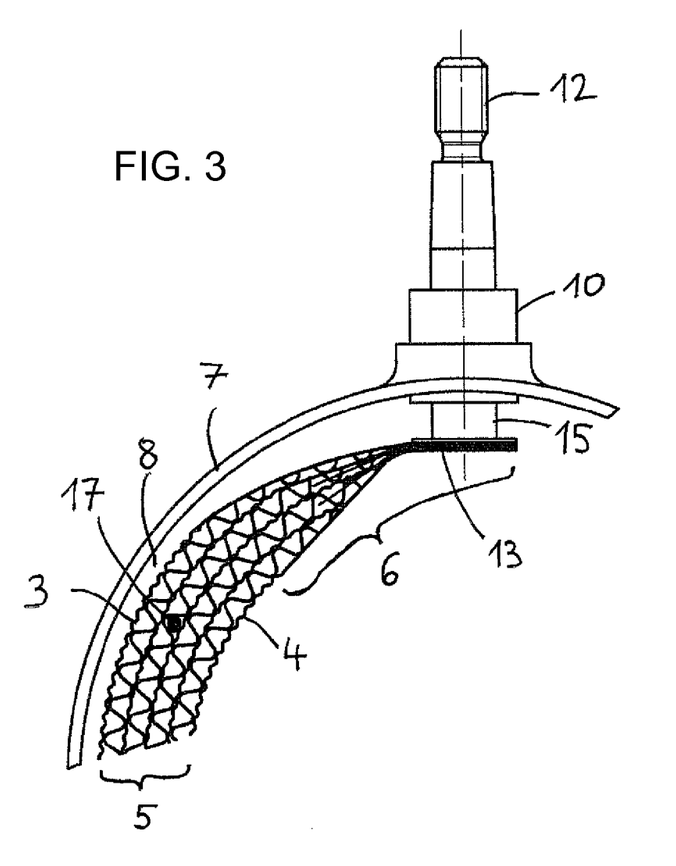
Figure 4:
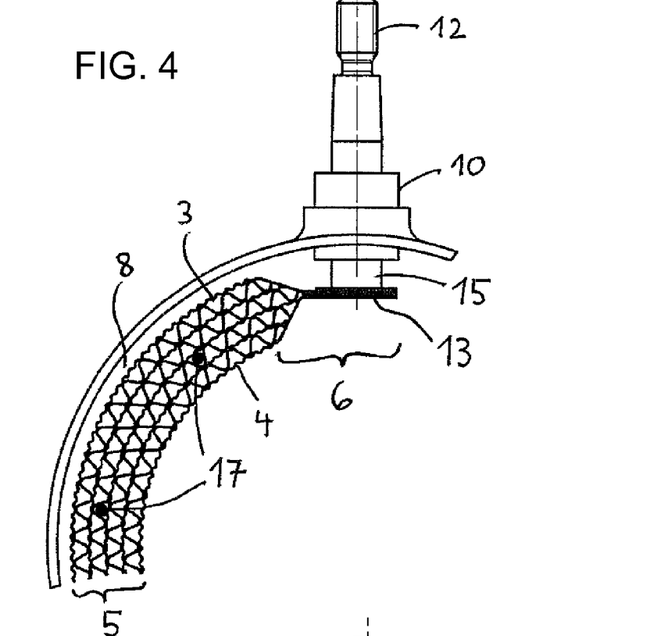
Figure 5:
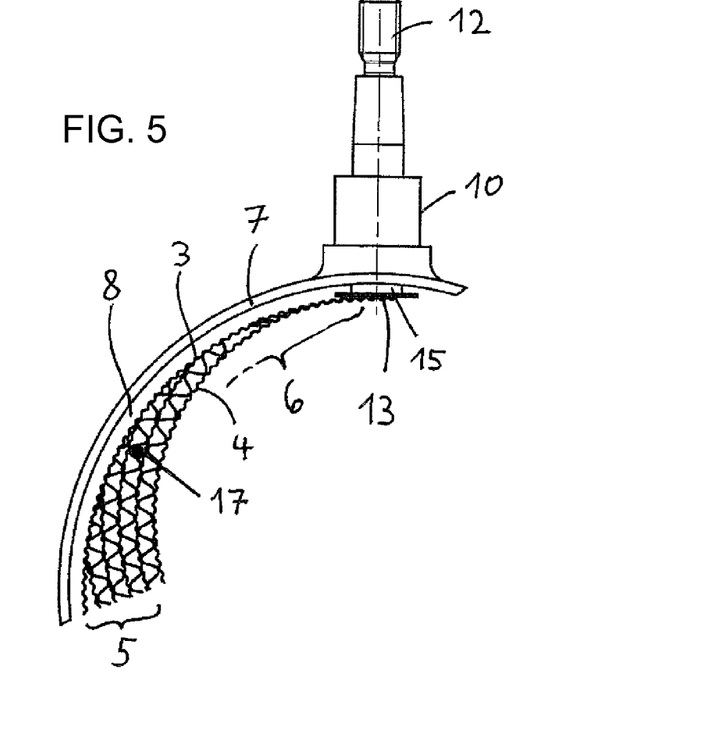

FIGS. 3, 4 and 5 diagrammatically illustrate different options according to the invention as to how the stack 5 can form a connection region 6 and can be fastened to a connecting end 15 of the connecting pin 12.

FIG. 3 illustrates one embodiment in which the stack 5 is squashed, crushed or squeezed in an ever increasing manner in a connection region 6 in the direction of the connecting pin 12, wherein all or the majority of sheet metal layers 1, 2, 3, 4 have an electrically conductive connection 13 to the connecting end 15 of the connecting pin 12, in particular, the uppermost sheet metal layer 3 and the lowermost sheet metal layer 4.

FIG. 4 illustrates a form of the connection region 6 that is slightly modified with respect to the exemplary embodiment of FIG. 3, wherein the corrugated sheet metal layers 2 are not squashed, crushed or squeezed together but rather terminate in the connection region 6 so that only the uppermost sheet metal layer 3 and the lowermost sheet metal layer 4 and, where appropriate, a part or all of the smooth or finely structured sheet metal layers 1, are connected in an electrically conductive manner to the connecting end 15 of the connecting pin 12.

FIG. 5 illustrates a further variant of the connection region 6, wherein all or a part of the inner sheet metal layers 1, 2 terminate adjacent one another in the connection region 6, preferably exiting at the uppermost sheet metal layer 3 so that the connection 6 tapers slowly in the direction of the connecting end 15 of the connecting pin 12, wherein at least the uppermost sheet metal layer 3 and the lowermost sheet metal layer 4 form an electrically conductive connection 13 to the connecting end 15 of the connecting pin.

Figure 6:
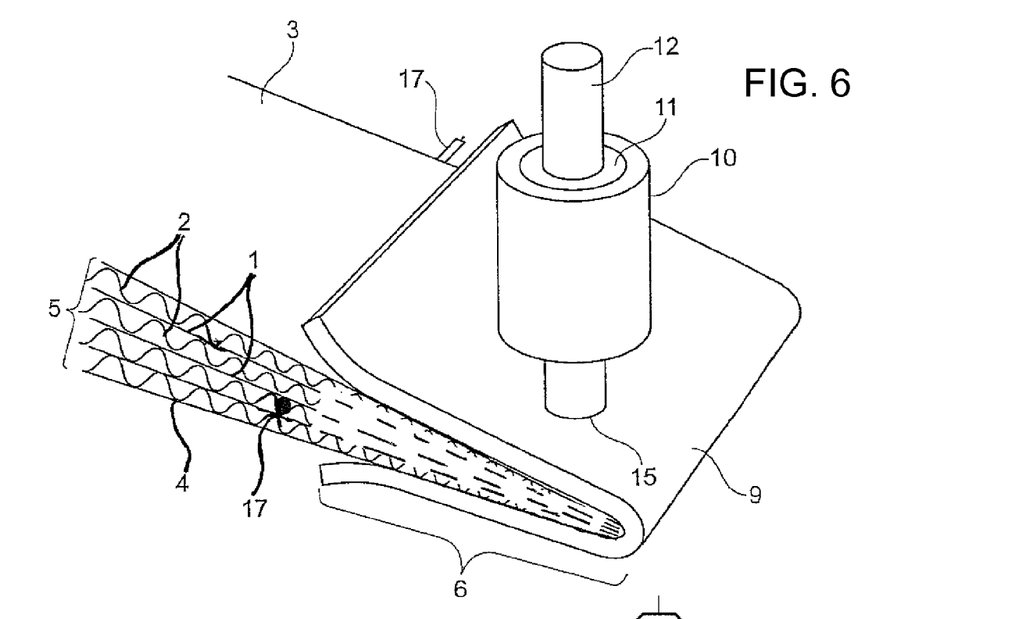
FIG. 6 is a fragmentary, perspective view illustrating different exemplary embodiments of an electrical connection in a honeycomb body according to the invention.

FIG. 6 diagrammatically illustrates how the connection region 6 of a stack 5 is formed from finely structured sheet metal layers 1 and coarsely structured sheet metal layers 2 in a different embodiment. A connecting pin 12, that is in turn insulated by an electrically insulating layer 11 from a feedthrough 10 through a non-illustrated metal casing, terminates with its connecting end 15 at an intermediate piece 9 and is connected and preferably welded or brazed thereto in an electrically conductive manner and where appropriate to ends of the sheet metal layers 1, 2 lying below the intermediate piece. In the present exemplary embodiment, the intermediate piece 9 encompasses or encloses the end of the stack 5 in the connection region 6, and the precise embodiment of the connection region 6 similar to that described above is possible in different embodiments. All of the sheet metal layers can preferably be squashed, crushed or squeezed together in an ever increasing manner or can be embodied with an ever reducing corrugation height in order to achieve the desired tapering shape. A supporting pin 17 can in turn stabilize the entire configuration.

Figure 7:
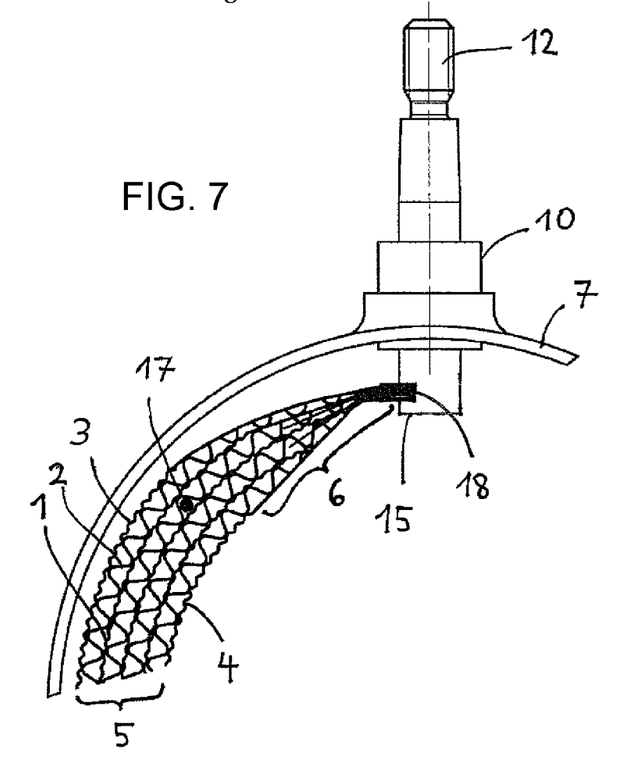

FIG. 7 diagrammatically illustrates a different structure of the supporting pin 12 that includes a cutout 18 on its connecting end 15 into which two or multiple sheet metal layers 1, 2 of the stack 5, preferably all of the sheet metal layers 1, 2, are embedded. Different methods for tapering the stack 5 are also considered in this figure. The electrically conductive connection is performed preferably by using welding or brazing.

Figure 8:
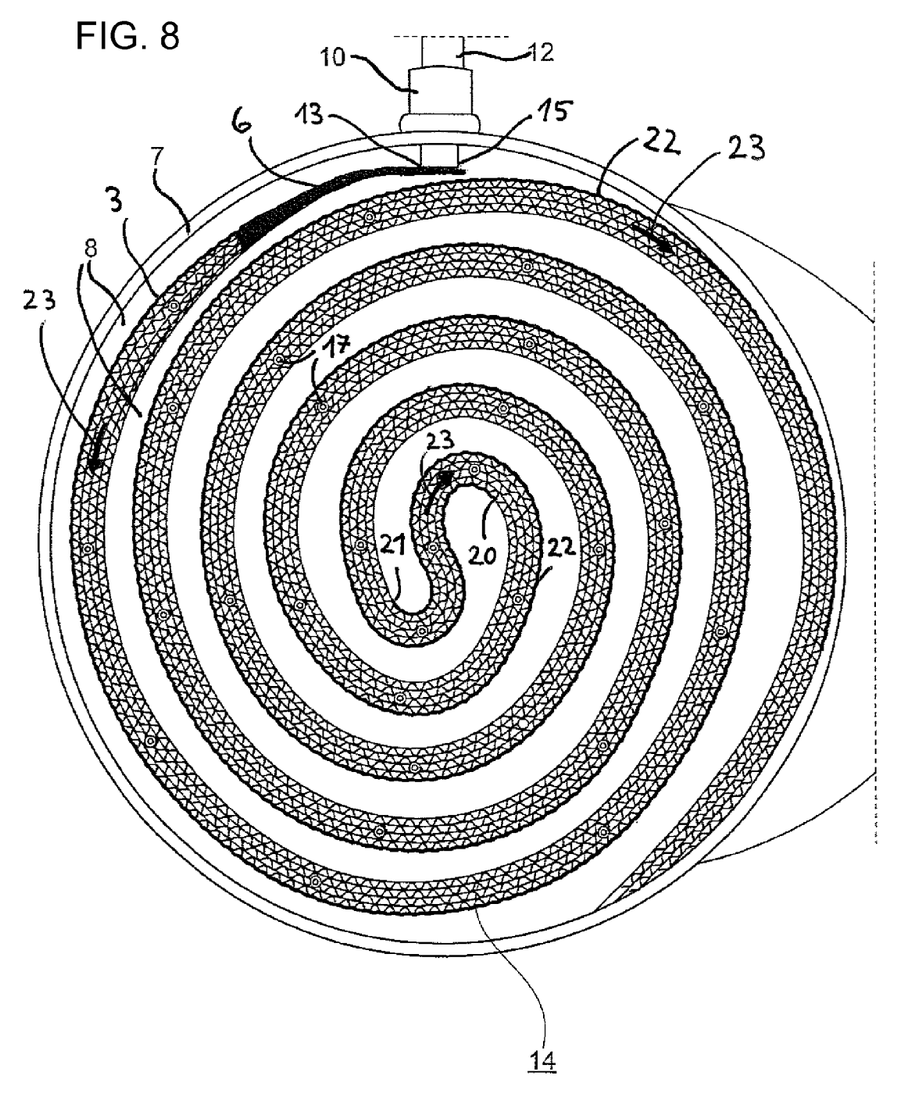
FIG. 8 is an end-elevational view of a honeycomb body according to the invention.

FIG. 8 illustrates an end face full view of further embodiments of a honeycomb body 14 in accordance with the invention having a stack 5 of sheet metal layers 1, 2 that are intertwined in opposite directions in an S-shaped configuration. The stack 5 includes an uppermost sheet metal layer 3 that, commencing from a connection region 6 up to its inner end 20 approximately in the central region of the honeycomb 14, has a greater thickness T than the other sheet metal layers 1, 2. In the further progression of the stack 5, the uppermost sheet metal layer 3 would become the lowermost sheet metal layer, for which reason it terminates inside the stack. For this purpose, however, the heretofore lowermost sheet metal layer 4, that then becomes another upper sheet metal layer 22, can have a greater thickness from its inner end 21 of this other upper sheet metal layer 22 and likewise can be embodied from a different material, in particular also from an alloy including nickel, chrome and iron. The stack 5 also includes a lowermost sheet metal layer 4 that, commencing from the connection region 6 over a partial region of 5 to 30 cm, likewise has a greater thickness T than the other sheet metal layers 1, 2. A multiplicity of supporting pins 17 is distributed over the length of the stack 5. One end of the stack 5 is formed into a tapering connection region 6 and is connected to a connecting end 15 of a connection pin 12. It is preferred that all of the sheet metal layers 1, 2 or, as described above, only a part of the sheet metal layers 1, 2, can be provided up to the connecting pin. The connecting pin 12 is guided radially outwards through a metal casing 7 by using a feedthrough 10 having an electrically insulating layer 11. The stack 5 is electrically insulated from the metal casing 7 by an air gap 8. The individual windings of the stack 5 are also electrically insulated from one another by an air gap. The sheet metal layers 1, 2, 3, 4 of the stack 5 form a central current path 23 that is indicated by arrows.

Figure 9:
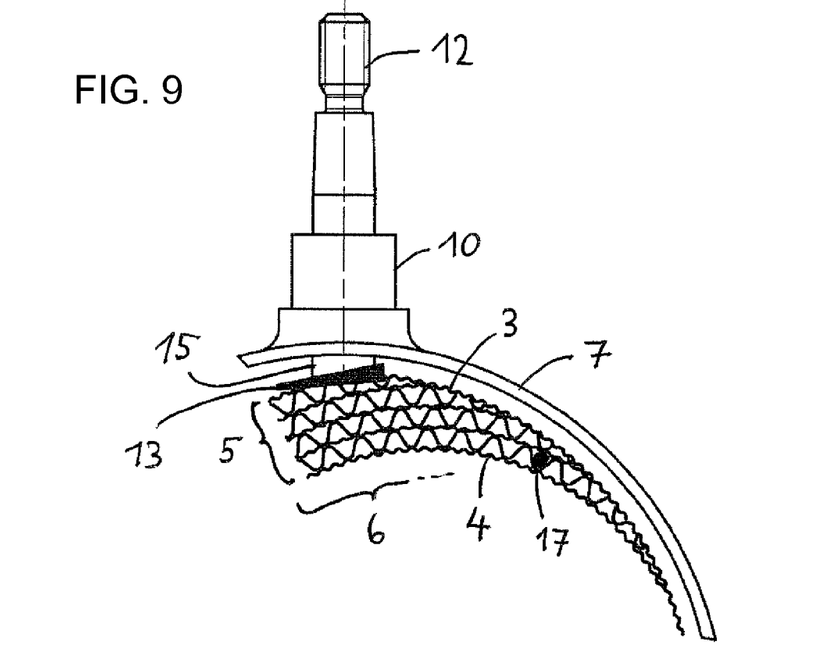
FIGS. 9 and 10 are fragmentary, cross-sectional views illustrating further exemplary embodiments of an electrical connection in a honeycomb body according to the invention.
Figure 10:
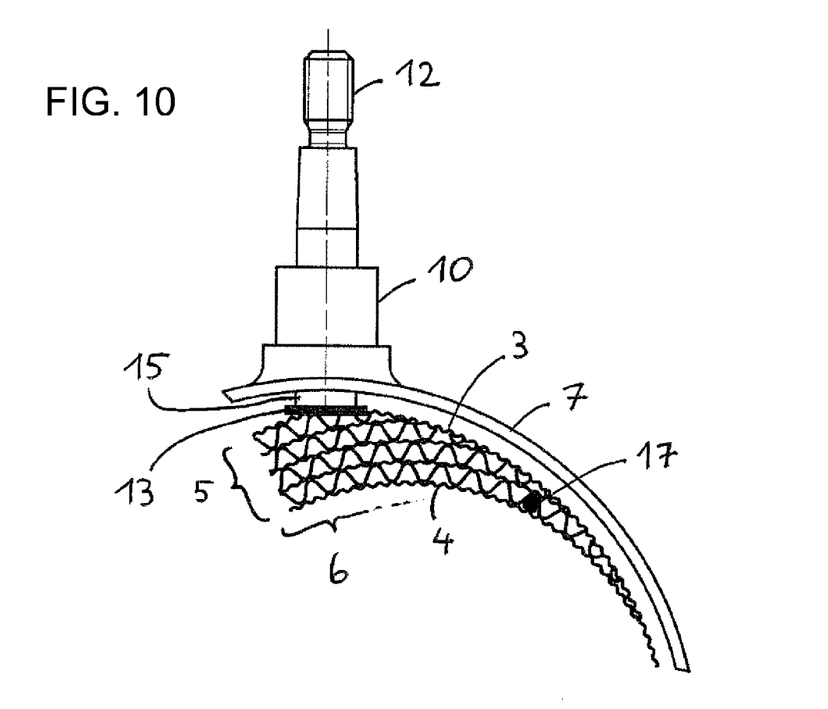

FIGS. 9 and 10 diagrammatically illustrate that it is not compulsory according to the invention to allow the connection region 6 to terminate exactly at the connecting end 15 of the connecting pin 12. It is quite possible, for example, due to reasons relating to manufacturing technology for the stack 5 to contact a piece prior to its end, but the construction can still manage without half shells or similar current distribution structures. The reason for this is that the most critical region of the stack 5 in the proximity of the connecting pin 12, where relatively high electrical current densities can occur during operation, is efficiently cooled by the solid connecting pin 12 itself and by the "protruding" part of the stack 5 and it therefore operates with only low current densities. It is also advantageous in these embodiments for an efficient electrically conductive uppermost sheet metal layer 3 to have a greater thickness T where appropriate. It is also necessary for at least one further sheet metal layer 1, 2 to be connected to the connecting end 15 of the connecting pin 12 in an efficient electrically conductive manner in order not to generate any high current densities in the uppermost sheet metal layer 3. This can be achieved, by way of example, by using a welded connection or a suitable brazed connection including two or multiple sheet metal layers. It is also possible to provide an intermediate piece 9 between the connecting pin 12 and the stack 5 for the purpose of increasing the contact area on 200 to 300% of the cross section area of the connecting pin 12. Depending upon the length of the part of the stack 5 that protrudes beyond the connecting pin 12, it is expedient to use at least one supporting pin 17 to protect this part against vibrations and against deformations that could lead to an electrical contact with the metal casing 7.

Even when multiple technical features are disclosed together in the figures for the sake of simplicity, their combination is not mandatory. On the contrary, technical details can also be interchanged and/or combined with other technical details of the description/other figures unless this has been explicitly excluded herein.

The present invention renders possible a construction of an electrically heated honeycomb body that is simple and cost-effective to manufacture and that even without current distribution structures or supporting half shells in the outer region renders it possible to distribute the current in a very uniform manner and consequently heat the honeycomb body.

The invention claimed is:

1. A honeycomb body, comprising:
a metal casing defining an inner periphery, an axial direction and a radial direction;
a feedthrough passing through said metal casing;
a plurality of alternately disposed coarsely structured sheet metal layers and finely structured or smooth metal sheets together forming a stack having an uppermost sheet metal layer, a lowermost sheet metal layer and channels between said sheet metal layers through which a gas can flow in said axial direction;
a connecting pin guided and electrically insulated in said feedthrough in said radial direction and electrically metallically connected to at least two of said plurality of sheet metal layers by an electrically conductive connection in a connection region directly or through at least one intermediate piece; and
said plurality of sheet metal layers together forming at least one central electrically conductive current path having an electrical resistance per unit length in said connection region being at most 10% greater than a central electrical resistance per unit length of said central current path in said stack.

2. The honeycomb body according to claim 1, wherein said uppermost sheet metal layer in said stack extends over at least 35% of said inner periphery parallel to said metal casing and is separated from said metal casing by an air gap.

3. The honeycomb body according to claim 1, wherein said uppermost sheet metal layer in said stack extends over at least 40% of a length of said inner periphery parallel to said metal casing.

4. The honeycomb body according to claim 1, wherein at least one of said uppermost sheet metal layer or said lowermost sheet metal layer of said stack is finely structured or smooth.

5. The honeycomb body according to claim 1, wherein at least one of said uppermost sheet metal layer or said lowermost sheet metal layer is thicker than the other sheet metal layers or at least has partial regions with a greater thickness.

6. The honeycomb body according to claim 5, wherein said lowermost sheet metal layer is thicker than the other sheet metal layers or has a greater thickness at least in said connection region and along a part of said stack.

7. The honeycomb body according to claim 1, wherein at least said uppermost sheet metal layer is formed of a NiCroFer steel containing nickel, chrome and iron.

8. The honeycomb body according to claim 1, wherein:
said coarsely structured sheet metal layers are shorter than said smooth or finely structured sheet metal layers in said stack; and
said coarsely structured sheet metal layers terminate prior to arriving at said connecting pin and only said smooth or finely structured sheet metal layers extend in said connection region up to said connecting pin.

9. The honeycomb body according to claim 1, wherein:
said coarsely structured sheet metal layers and said finely structured sheet metal layers are each corrugated; and
a second corrugation height of said coarsely structured sheet metal layers is greater than a first corrugation height of said finely structured sheet metal layers by a factor of 3 to 10.

10. The honeycomb body according to claim 1, wherein:
said coarsely structured sheet metal layers and said finely structured sheet metal layers are corrugated; and
a second corrugation length of said coarsely structured sheet metal layers is greater than a first corrugation length of said finely structured sheet metal layers at least by a factor of 1.5.

11. The honeycomb body according to claim 1, wherein said connecting pin is connected directly to smooth or finely structured sheet metal layers of said stack.

12. The honeycomb body according to claim 1, wherein:
said connecting pin is metallically connected to said sheet metal layers of said stack by interpositioning said intermediate piece; and
said intermediate piece encompasses multiple sheet metal layers of said stack in said connection region.

13. The honeycomb body according to claim 1, wherein:
said connecting pin is metallically connected on a surface area of at least 10 $mm^2$ to between two and five of said sheet metal layers of said stack; and
said connecting pin has a connecting end disposed at a distance of 3 to 8 mm from said inner periphery of said metal casing.

14. The honeycomb body according to claim 1, wherein:
said stack includes five to fifteen of said sheet metal layers and is intertwined in opposite directions in an S-shaped configuration in the honeycomb body; and
said stack has windings electrically insulated from one another by an air gap.

15. The honeycomb body according to claim 13, wherein:
said uppermost sheet metal layer of said stack is thicker than others of said sheet metal layers or said uppermost sheet metal layer of said stack has an area of greater thickness; and
at least one of said thicker uppermost sheet metal layer or said area of greater thickness extends only over a part of a length of said stack.

16. The honeycomb body according to claim 1, which further comprises:
a multiplicity of supporting pins stabilizing a shape of said stack;
at least one of said supporting pins being disposed at a distance from said connecting pin of less than 10 cm, measured along a progression of said stack.

* * * * *